Sept. 8, 1964 G. H. ERB 3,147,528
SEPARABLE FASTENER ELEMENT
Filed Nov. 14, 1961 2 Sheets-Sheet 1
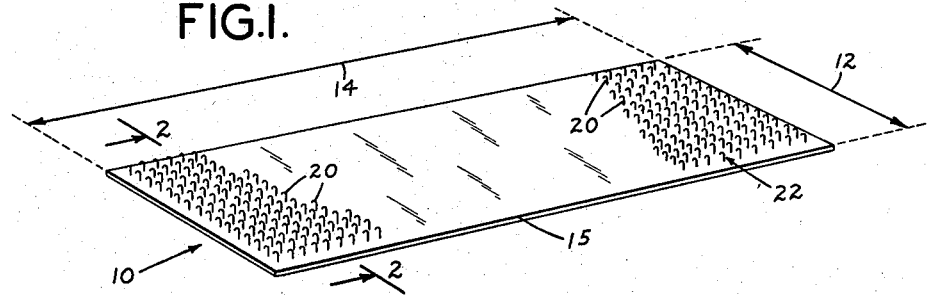
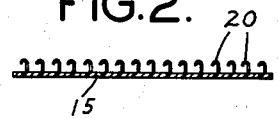
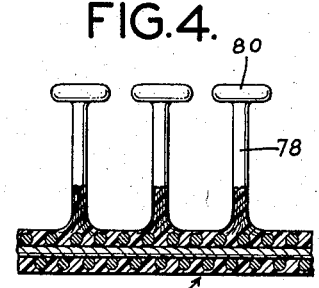
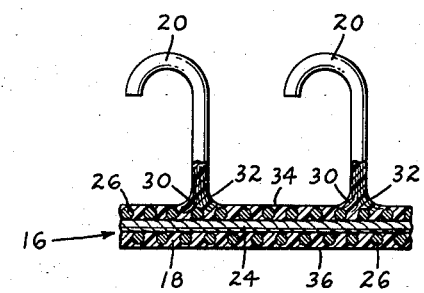
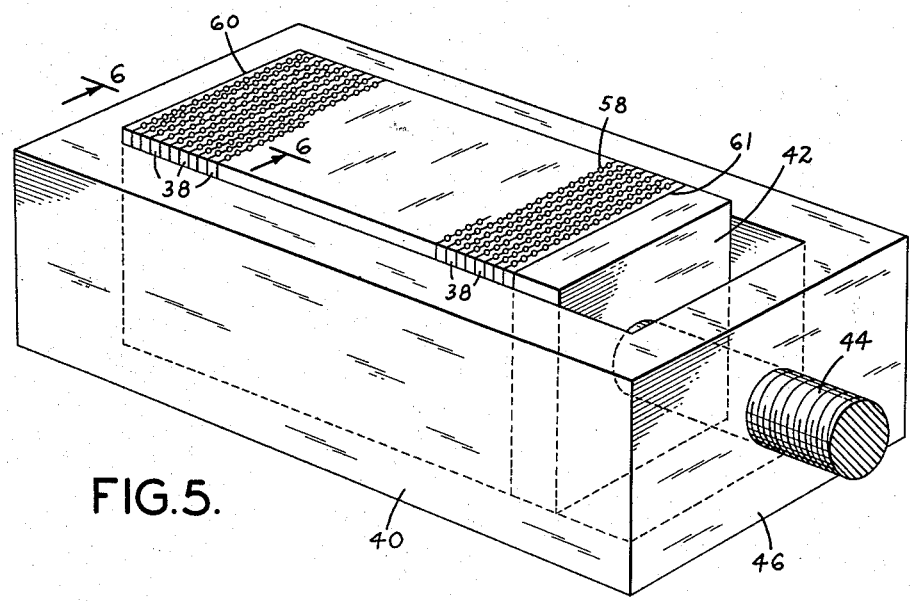

Sept. 8, 1964  G. H. ERB  3,147,528
SEPARABLE FASTENER ELEMENT
Filed Nov. 14, 1961  2 Sheets-Sheet 2
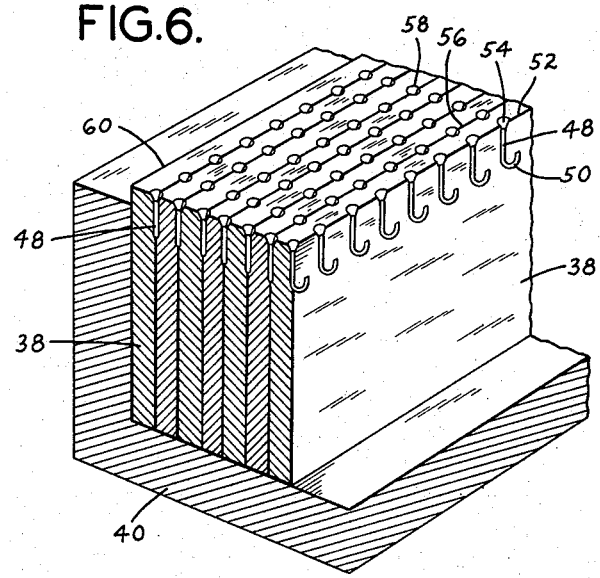
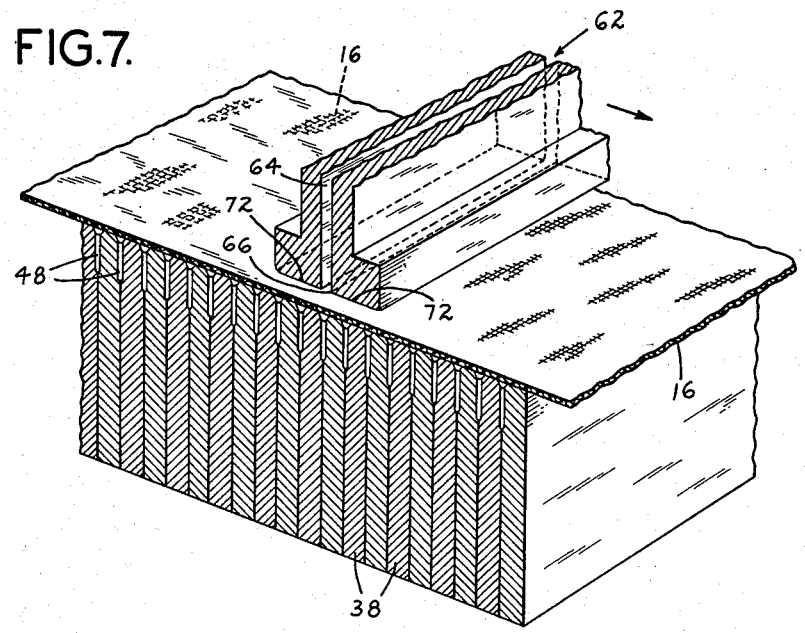

United States Patent Office 3,147,528
Patented Sept. 8, 1964

3,147,528
SEPARABLE FASTENER ELEMENT
George H. Erb, Fayson Lakes, N.J., assignor, by mesne assignments, to Velcro S.A., Soulie, Switzerland, a corporation of Switzerland
Filed Nov. 14, 1961, Ser. No. 152,258
4 Claims. (Cl. 24—204)

The present invention relates to separable fastener elements consisting of strips or sheets of predetermined size made of flexible sheet material having on one surface a very large number of closely spaced pile-like protuberances such as hooks, knobs or loops adapted to engage with appropriately constructed protuberances carried by another fastening element. The fastening elements of the present invention are similar to known forms of such devices which are woven as textile ribbons with special loop pile yarns which have been heat-set and cut to form hooks. United States Patent 2,717,437 to De Mestral discloses such a fastening element. However, the fastening elements of the present invention are molded from a suitable plastic material into a strong flexible base sheet with integrally molded protuberances which may be in the form of hooks or other suitable conformations for engagement with another fastening element of suitable construction.

In a preferred form of the present invention the base sheet incorporates a preformed strip of porous sheet material such as woven or non-woven fabric made of natural, synthetic or metallic fibers or perforated materials such as paper, felt or sheet plastic, into and through which a moldable plastic material is forced into suitable injection molds for the formation of the protuberances. The resulting product thus consists of the preformed base sheet impregnated with a plastic material which in turn is integral with the molded plastic protuberances. By proper selection of the preformed base sheet material the final product may have a very thin, strong and flexible base or a relatively thicker and less flexible base, as may be desired, but in either event the plastic material which constitutes or which serves as the impregnant in the base sheet also serves to form the integral pile-like hooks or other protuberances.

A specifically preferred form of the present invention includes a strip or sheet of woven cotton fabric of the type normally used in the manufacture of cambric. Molten nylon is forced from one surface of the cotton fabric through the same and into an injection mold having a large number of recesses suitably shaped to form the hooks or other desired fastening protuberances which will be integral with the body of nylon impregnated into the woven fabric.

The method and particular apparatus employed for the manufacture of such fastening elements does not form a part of the present invention, but a simple apparatus will be disclosed in order that the nature and structure of the fastening elements may be more readily understood. It will be apparent that other apparatus and other methods may be employed for the manufacture of fastening elements of predetermined limited size as disclosed herein, and that still other methods and apparatus may be employed for the continuous production of fastening elements in the form of webs or ribbons which may be cut into sizes suitable for various uses.

It is an object of the present invention to provide fastening elements of the type discussed above. Other and further objects will become apparent from a consideration of the following detailed description of preferred forms of the present invention taken in connection with the drawings forming a part of this specification.

In the drawings:

FIG. 1 is a perspective view on an enlarged scale of a fastening element embodying the present invention;

FIG. 2 is a vertical sectional view taken along the line 2—2 in FIG. 1;

FIG. 3 is a greatly enlarged and somewhat diagrammatic fragmentary vertical sectional view taken along the line 2—2 in FIG. 1;

FIG. 4 is a view similar to FIG. 3 showing a modified form of fastening element embodying the present invention;

FIG. 5 is a schematic perspective view of an injection molding apparatus which may be used for the manufacture of fastening elements embodying the present invention;

FIG. 6 is a fragmentary sectional view taken along the line 6—6 in FIG. 5; and

FIG. 7 is a fragmentary view similar to FIG. 6 showing a separable fastener element in the process of being manufactured.

Referring now to the drawings, the separable fastener element shown in FIG. 1 is illustrative of a preferred form of the present invention and comprises a relatively small element of predetermined dimensions which is capable of manufacture by the use of the very simple hand operated apparatus illustrated herein. Solely by way of example, the fastening element 10 shown in FIG. 1 may comprise a strip of material approximately one inch wide as measured along the dimension line 12 and approximately three inches long as measured along the dimension line 14. The fastening element 10 comprises a base sheet 15, made up of a piece of woven fabric 16 (see FIG. 3) embedded in a plastic material 18 which is integral with a very large number of closely spaced hook shaped protuberances 20 extending generally vertically from one surface of the base sheet. The fastening element 10 has been formed by forcing molten or otherwise flowable plastic material through the fabric 16 from the lower surface thereof as seen in FIG. 1, into an injection molding device provided with suitable mold recesses in which the hooks 20 are formed.

While the number of hooks and the arrangement thereof are matters of choice, it will be understood that to be effective as a fastening element, the element 10 should have a rather large number of hooks per unit of area. By way of example, the illustrated fastening element 10 is provided with parallel rows 22 of hooks 20 extending transversely thereof, there being approximately twelve rows 22 per inch of length of the element 10 and there being approximately sixteen hooks per inch in each row. Thus, for each square inch of area of the fastening element 10 there will be approximately one hundred ninety-two hooks. The illustrative number and distribution of the hooks has been found to be quite satisfactory in the manufacture of fastening elements for use as closures for garments, garment pockets, portfolios and the like.

Preferably the closure elements of the present invention are associated in use with a cooperating closure element in the nature of a loop pile fabric having a very large number of closely spaced closed loops of strong yarn or filaments forming the pile thereof so that when the fastening element of the present invention is pressed into face to face contact with such loop pile fabric a very large percentage of the hooks 20 will become engaged with one or more of the closed loops in the cooperating pile fabric closure element. A particularly satisfactory closure may be effected by the use of a fastening element 10 in which the fabric 16 is a strong, firmly woven cotton fabric and in which the fabric has been impregnated with nylon forced through the fabric 16 in molten condition to form the injection molded hooks 20. The nylon hooks 20 will be found to be springy and strong and yet capable of being temporarily distorted to permit separation of the fastener elements when so desired.

The cooperating closure element (not shown) may comprise an astrakhan type of loop pile velvet material wherein the individual loops are nylon filaments. For example, continuous nylon multifilament yarns may be woven into a ribbon as loop pile warps which are thereafter brushed to separate the individual multifilaments of each yarn within the loops. Such astrakhan fabric offers many hundreds of individual loops per square inch whereby nearly all of the hooks 20 will become engaged with one or more loops whenever the elements of the fastener are pressed together.

As will be apparent from an inspection of FIGS. 1 and 2, the illustrated hooks 20 in each row 22 are so formed as to have the open hooked ends thereof opening in the same direction. If so desired, however, alternate rows of hooks may be faced in opposite directions or the hooks within each row may be faced alternately or otherwise non-uniformly.

As shown in FIG. 3, the fabric 16 may comprise weft yarns 24 with warp yarns 26 alternating above and below the weft yarns as is usual in a plain weave fabric. Obviously the fabric 16 need not be plain weave and such is illustrated herein simply for purposes of simplicity. A preferred form of fabric 16, as indicated above, is woven from cotton warp and weft yarns and is similar in structure to the fabric used for the manufacture of cambric. Also, preferably the yarns 24 and 26 are quite fuzzy, having hairlike fibers 30 which, as will be explained below, are swept by the flow of plastic material through the fabric into the base portions of each of the hooks 20 to assume positions such as shown in FIG. 3. These hairlike fibers normally remain attached to the yarns from which they extend and thus serve to reinforce the base of each hook 20.

As shown in FIG. 3, each hook 20 is preferably formed with a fillet 32 which smoothly joins the body of the hook 20 and the body of plastic material 18 which is impregnated into the fabric 16. The fillets 32 serve to strengthen the base of each hook 20. The plastic material 18 which impregnates the fabric 16 will form substantially smooth upper and lower surfaces 34 and 36 which preferably are generally coincident with the upper and lower surfaces of the fabric 16.

Illustratively the fabric 16 is impregnated with nylon and the total thickness of the impregnated fabric comprising the base sheet may be about 0.015 inch. Also illustratively, the body of each hook may have a diameter of approximately 0.010 inch and the hooks may be approximately 0.060 inch high. When hooks of these dimensions are spaced as illustratively set forth above on such a base sheet the resulting molded fastening element has characteristics very similar to the characteristics of one popular form of woven fastening element currently available in the market.

Referring now to FIGS. 5 and 6, there is shown a simple apparatus having separable mold forming parts suitable for injection molding of the hooks 20. It will be understood that shapes such as the hooks 20 would be difficult, if not impossible, to remove from injection mold recesses sunk into the surface of a solid block of metal. Accordingly, some form of separable molding device is desirable wherein the mold recesses may be opened to permit withdrawal of the molded hooks 20. Thus, as shown in FIG. 5, a plurality of separate mold forming plates 38 are assembled to form a solid block of plates within a suitable mold holder or box 40. The plates 38 have complementary recesses formed along the upper edges thereof which form injection molding cavities when the plates are pressed together as shown in FIG. 5. The plates 38 may be pressed together by means of a pressure plate 42 which is arranged to slide within the central opening of the box 40 and which may be pressed against the block of plates 38 by a screw 44 threaded through the end wall 46 of the box 40. After each full set of hooks 20 is molded in the cavities in plates 38 the screw 44 may be loosened to permit relative movement between the plates 38 whereupon the hooks may be stripped from the mold cavities.

In FIG. 6 several illustrative plates 38 are shown pressed into operative position within the box 40. Each plate 38 has formed along the right-hand upper edge 52 a row of recesses 48 each of which is semicylindrical in cross-section so as to constitute one-half of the mold cavity necessary for the formation of a hook 20. As will be observed, the recesses 48 each have a return portion 50 which defines the outermost reverse portion of each hook 20. Also, each recess 48 opens into the upper edge 52 of the plate 38 to form a semicircular opening 54. Each opening 54 is preferably flared outwardly as it approaches the edge 52 in order to form the fillet 32 at the base of each hook 20. Each plate 38 has an opposite upper edge 56 in which is formed a plurality of semicylindrical recesses 48 complementary to the recesses and flared semicircular openings 58 complementary to the openings 54. As will be clear from FIG. 6, when the plates 38 are pressed firmly together the upper edges 52 and 56 will coincide to form a substantially continuous upper surface broken only by the circular holes which are made up of the complementary halves 54 and 58. The plate 38 which is at the extreme left-hand end of FIG. 6 need not have mold forming recesses sunk into the upper edge 60 thereof and similarly the plate 38 which is at the extreme right-hand end of FIG. 5 need not have such recesses formed in its right-hand upper edge 61 (see FIG. 7).

For the illustrative fastening element described in detail above each plate 38 will have a length of approximately one inch and each will have sixteen recesses 48 so spaced as to register accurately when the plates are pressed together.

Each plate 38 may be approximately 0.080 inch thick whereby to space the rows of mold cavities approximately twelve per inch. Approximately thirty-seven plates 38 will be required to form a fastening element three inches long. Preferably, also the plates 38 are of such a height as to extend very slightly above the upper edges of the box 40, as shown in FIGS. 5 and 6.

For manufacture of a fastening element with the apparatus shown in FIGS. 5 and 6, a piece of fabric 16 is laid across the contiguous top surfaces of the plates 38 while the latter are clamped in the box 40 (see FIG. 7). The piece of fabric may be approximately the size of the desired finished product or it may be somewhat larger so as to provide marginal edges which may be gripped by suitable devices (not shown) to hold it in proper position.

As shown in FIG. 7, a nozzle 62 having an interior passageway 64 and an elongated orifice 66 is provided. The orifice 66 is closed at opposite ends of the nozzle 62 and is of such length as to extend throughout the length of each row of mold cavities in the individual plates 38. The interior passageway 64 of nozzle 62 communicates with a suitable source of liquid plastic material to which pressure may be applied. For example such source may be an extruder of any well known type capable of supplying a molten plastic material under suitable pressure. The orifice 66 of nozzle 62 is preferably quite narrow, for example having a width which is not a great deal more than the diameter of the openings into the mold cavities 48. The nozzle may be progressively moved to the right or left as viewed in FIG. 7 across the block of plates 38 to successively project molten plastic material through the fabric 16 and into one row at a time of the mold cavities therebeneath. For this purpose the nozzle 62 will be pressed firmly into contact with the fabric 16 at one end or the other of the block of plates 38 and will be progressively moved toward the other end at such a rate of speed as to insure complete impregnation of the fabric and complete filling of all of the mold cavities 48.

The nozzle 62 is preferably provided with lips 70 and 72 extending generally horizontally and laterally of the width of the orifice 66 to form a seal against the fabric 16 when the nozzle is firmly pressed thereagainst. Also, when the nozzle 62 is moved progressively along the fabric 16 the lip 70 or 72 which is trailing will serve as a doctor to substantially level the upper surface of the plastic material with the upper surfaces of the yarns from which the fabric 16 is formed. The trailing lip will also serve to maintain pressure upon the plastic material to permit it to cool by transfer of heat to the metal plates 38 and thus at least partially solidify while still confined under the lip.

After the nozzle 62 has been moved across all of the plates 38 the supply of molten material is interrupted and, if necessary, the nozzle may be held in place momentarily to permit the last deposited molten plastic material to cool and solidify within the fabric and the mold recesses. The nozzle 62 may then be removed and the screw 44 may be loosened. The completed fastening element now may be progressively stripped from the mold preferably starting at the right-hand end thereof as viewed in FIG. 5 so that the relatively stiff hooks 20 may successively move the plates 38 away from each other to open the mold cavities 48. The lower surface 36 of the fastening element as shown in FIG. 3 will have been formed by the doctoring action of the nozzle 62 while the upper surface 34 thereof will have been molded against the contiguous upper surfaces of the plates 38.

In FIG. 4 there is shown a modified form of pile-like protuberance which may be molded in the manner disclosed above and which may serve as fastening elements when placed in cooperation with suitable cooperative elements. Thus the base sheet material 76 may be similar to or identical with that described hereinabove and the protuberances 78 may comprise relatively thin upright cylindrical bodies having enlarged heads 80 molded integrally therewith. It will be recognized that molded protuberancs such as these headed bodies, like the hooks 20 could not be readily removed from one piece molds. However, a separable mold apparatus as described above may be used to manufacture the modified form of fastening element shown in FIG. 4. Obviously other forms of protuberances capable of interlocking with similar or other especially designed surface materials may be provided within the scope of the present invention.

From a consideration of FIG. 7 it will be apparent that if the fabric 16 is woven from yarns which are somewhat fuzzy, as mentioned above, the molten plastic material which is forced from the nozzle 62 through the fabric and into the recesses 48 will sweep the fibers into the mold cavities to assume the position illustrated at 30 in FIG. 3. It also will be understood that while molten nylon is the preferred material for impregnation and injection molding of the fastening elements of the present invention other liquid plastic materials capable of setting by chemical action or by cooling or both may be used. In the selection of such other substances the characteristics thereof should include sufficient flexibility and springiness combined with durability as may be required for the particular purpose to which the fastener element is to be applied.

It will be understood that the present invention is not limited to fastening elements of the particular size chosen for illustration since longer or shorter plates 38 may be used to produce fastening elements of greater or less width and a larger or smaller number of plates 38 may be used to produce fastening elements of greater or less length. Also a longer fabric strip 16 may be used and successive increments of the length thereof may be brought into molding apparatus of the type shown herein for manufacture in an intermittent fashion of fastening elements having a total length constituting any desired multiple of the length which may be formed in each successive molding step.

In some instances it may not be desired to include a fabric or other porous sheet in the base sheet 15 (FIG. 1) in which event a slightly different nozzle may be used which is capable of extruding a solid sheet of molten plastic of predetermined thickness upon the upper surfaces of the plates 38 while simultaneously forcing molten plastic into the mold cavities 48. The resulting product will be made wholly from plastic material and the base sheet 15 will be integral with the molded hooks 20.

What is claimed is:

1. A separable fastener element comprising a flexible base sheet and a plurality of closely spaced flexible pile-like protuberances distributed over at least a substantial portion of the area of a surface of said base sheet, said protuberances including portions extending generally perpendicularly from said surface of said base sheet and including portions extending laterally of said first-named portions, said base sheet comprising a sheet of porous fabric woven from fuzzy yarns having a very large number of closely spaced openings between the yarns thereof extending through said fabric in directions generally perpendicular to the plane thereof, and said fabric being impregnated with a strong flexible plastic material which extends through the openings in said fabric to form said protuberances as integral continuations of the plastic material extending through the openings in said fabric, and each of said protuberances having fibers extending thereinto from said fuzzy yarns.

2. A fastener element in accordance with claim 1 wherein said protuberances are hooks and the laterally extending portions thereof are turned back towards said base sheet.

3. A fastener element in accordance with claim 2 wherein said plastic material is nylon.

4. A fastener element in accordance with claim 1 wherein said plastic material is nylon.

References Cited in the file of this patent

UNITED STATES PATENTS

| 1,959,319 | Sipe | May 15, 1934 |
|---|---|---|
| 2,470,963 | Weyl | May 24, 1949 |
| 2,499,898 | Anderson | Mar. 7, 1950 |
| 2,891,347 | Swint | June 23, 1959 |
| 2,909,822 | Botti | Oct. 27, 1959 |
| 3,031,730 | Morin | May 1, 1962 |

FOREIGN PATENTS

| 956,320 | France | Jan. 30, 1950 |
|---|---|---|
| 1,064,360 | France | May 13, 1954 |
| 1,232,367 | France | Oct. 7, 1960 |
| 901,041 | Germany | Jan. 7, 1954 |